Aug. 15, 1967

P. J. JESSEN 3,335,598

STAKING DEVICE

Filed Oct. 28, 1964

Inventor
PAUL J. JESSEN
By Carl J. Barbee
Attorney

Aug. 15, 1967 P. J. JESSEN 3,335,598
STAKING DEVICE
Filed Oct. 28, 1964 2 Sheets-Sheet 2
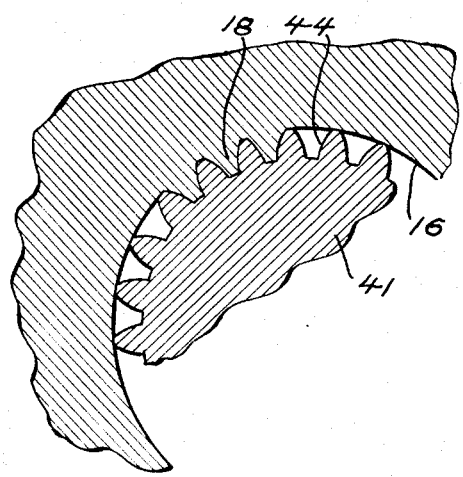
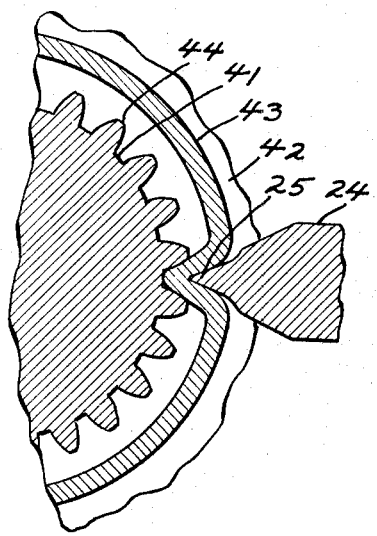
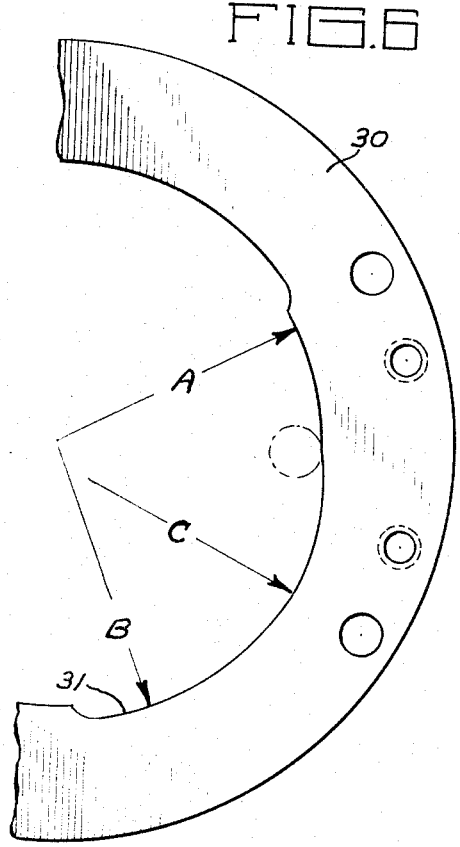
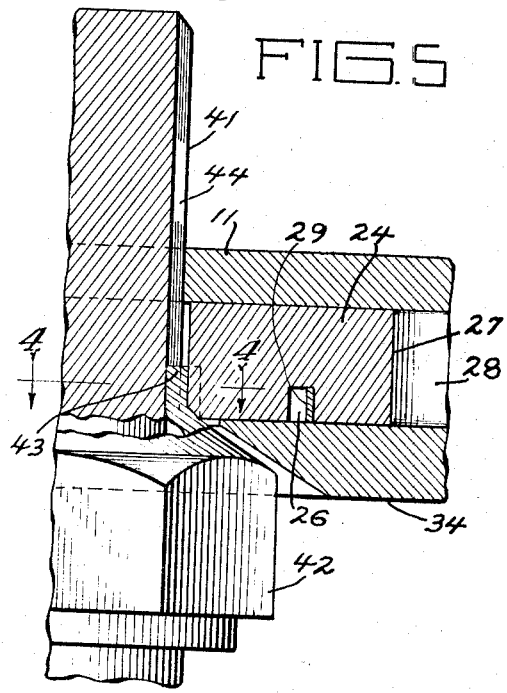
Inventor:
PAUL J. JESSEN
By Carl J. Barbee
Attorney United States Patent Office 3,335,598
Patented Aug. 15, 1967

3,335,598
STAKING DEVICE
Paul J. Jessen, Kenosha, Wis., assignor to American Motors Corporation, Kenosha, Wis., a corporation of Maryland
Filed Oct. 28, 1964, Ser. No. 407,134
5 Claims. (Cl. 72—402)

ABSTRACT OF THE DISCLOSURE

A mechanism having at least one staking element locatable in relation to a first member and a second member for staking a second member to the first member without relative movement therebetween.

It is common knowledge that after tightening a nut on a threaded shaft to secure some vibrating or moving object in position, that it is necessary to lock the nut to the shaft to prevent the nut from backing off from the object. Conventionally, this is accomplished by use of a variety of lockwashers. It can also be accomplished by staking or deforming the shaft thread as by a punch to prevent movement of the nut thereon, or by staking the nut to the thread. Lockwashers are expensive, and staking a thread damages same, thereby limiting further use. Staking the nut to the thread, therefore, is frequently the preferred method of locking a nut on a threaded shaft.

Staking the nut to the thread can be achieved merely by the use of a hammer and a chisel or the like. However, this method is not of consistent effectiveness as it varies with the worker. The use of a staking device to stake the nut provides a more definite and controllable operation and an improved product.

Applicant, however, has discovered disadvantages in the staked nut arrangement resulting from the above noted operation. One objection is that the thread to which the nut is staked lies in the direction of rotation of the nut and, therefore, does not provide a positive stop thereto. Also the thread may be damaged. Finally the staking device, even if engaging the thread, is not restrained thereby and may further tighten or loosen the nut in the staking process.

Applicant had a specific problem in mind when designing the staking device of this invention, namely, the staking of the pinion shaft nut to the pinion shaft of a vehicle differential gear. Obviously, it was necessary to use a device for a controllable operation. In addition, a positive locking arrangement was most desirable. Applicant, therefore, settled on the utilization with the device of the axial splines of the pinion shaft that are necessary for engagement by the conventional universal joint that connects the pinion shaft to the vehicle transmission by means of a propeller shaft. To be an effective and reusable staked nut arrangement, however, the staking device had to be adapted to engage the splines so as to stake the nut therebetween at a limited number of places. Further, the staking had to be accomplished without rotating the nut or the shaft relative to each other. For to do so would cause the cones of the shaft roller bearings to shift in regard to the associated cups, thereby varying the preload on the roller bearings. During the assembly of the pinion shaft in the differential housing, the nut is torqued on the shaft and the shaft is then rotated to check on the resulting preload which is necessary to account for expansion due to heat and loads of vehicle operation. Clearly, tightening and loosening the pinion nut after it has been adjusted to secure the desired preload merely to lock same, defeats this purpose.

As a consequence, applicant's device, therefore, has a locator element which engages the splines of the shaft and which, along with the shaft, can be restrained from moving by use of an attached handle. This element of the device also rests on the nut and due to its weight aids in preventing motion of the nut relative to the thread. A second element of the device has three internal cammed surfaces and also a long handle attached thereto. Movement of this handle with the other handle held stationary, rotates the cammed surfaces causing the rollers in contact therewith to force radially inward the three circumferentially, equally spaced hardened teeth in the locator to compress the flange projecting from the soft nut into the spline roots to lock the nut to the hard shaft. Movement of the handle and the cammed surfaces in the opposite direction causes the rollers to move outward with the teeth which are brought from engagement with the nut flange by flat type springs positioned in the locator. The teeth, since moving radially inward at equally spaced intervals to contact the nut, do not have any major tendency to rotate the pinion nut on the shaft during the staking operation. The weight of the tool, as mentioned previously, also aids in preventing motion between the held shaft and nut.

From the above, it is clearly apparent that the staking device of this invention can be located on the splined shaft and the nut flange positively staked between the shaft splines in contact with the device without turning the nut on the shaft. The staked nut arrangement produced by the device provides an improved and cheaper differential gear assembly suitable for low powered vehicles.

It is, therefore, an object of this invention to provide a new and improved staking device.

Another object of this invention is to provide a staking device which locates same in relation to a first member and stakes a second member to the first member.

Another object of this invention is to provide a staking device which locates same in relation to a first member and stakes a second member to the first member without relative motion between members.

Other objects and advantages will become apparent from the following description in conjunction with the attached drawings in which:

FIGURE 3 is a top section along line 3—3 of FIGURE 2 disclosing the locator portion of the device.

FIGURE 4 is a top section along line 4—4 of FIGURE 5.

FIGURE 5 is an enlarged fragmentary vertical section showing the staking device, nut and pinion shaft in full staked position.

FIGURE 6 is a plan view of the cam member of the device and the internal cam located therein.

Figure 1:
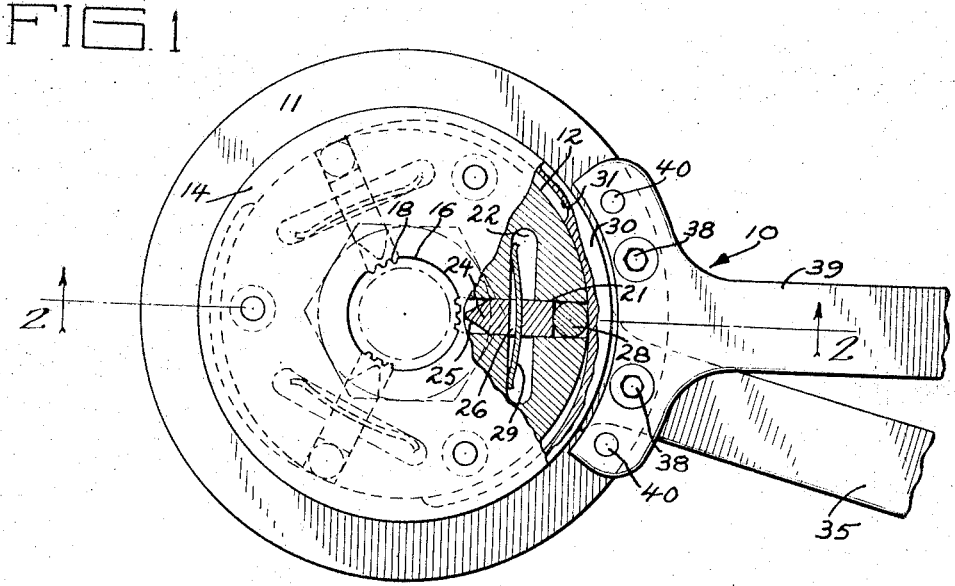
FIGURE 1 is a plan view, partially in section, of the staking device in position on a differential pinion shaft and nut arrangement which are shown here in phantom lines.
Figure 2:
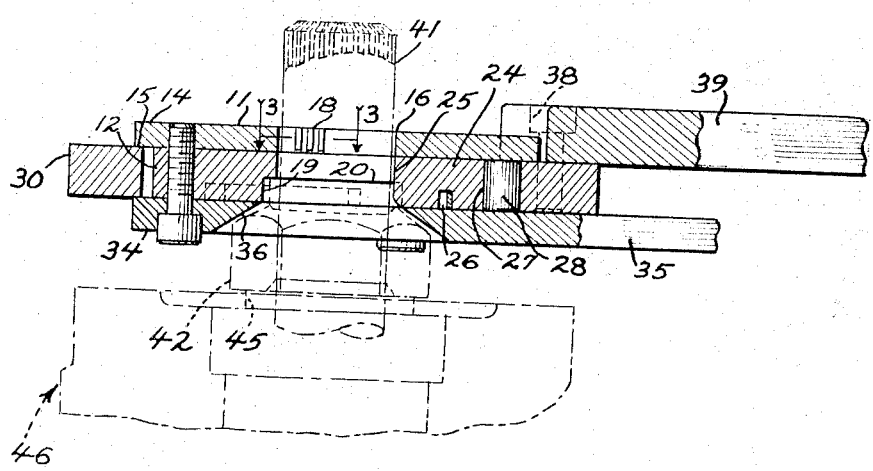
FIGURE 2 is a vertical section taken along line 2—2 of FIGURE 1.

Referring to FIGURES 1 through 6, 10 indicates generally the staking device. The device 10 includes a locator housing 11. Housing 11 has a cylindrical ground exterior 12 and a flanged top 14 made integral therewith and providing shoulder 15 therebetween. Housing 11 also has an entrance 16 which has located therein three circumferentially, equally spaced portions 18 having internal splines. Generally opposite entrance 16 is inlet 19 having seat 20 therein. Extending radially into inlet 19 from exterior 12 are passages 21. Each passage 21 is generally aligned axially with a splined portion 18. Generally transverse to each passage 21 is a gallery 22.

Located in each passage 21 is staking punch 24. Staking punch 24 has a pointed end 25 adjacent inlet 19 and aligned with a tooth in splined portion 18. Opening 26 in punch 24 is located between pointed end 25 and end 27 which is in contact with cylindrical roller 28. Roller 28 is also located in passage 21. Extending through opening 26 in punch 24 and located in gallery 22 is a flat type spring 29.

Surrounding the exterior 12 of locator housing 11 is cam member 30 which is best shown in FIGURE 6. Member 30 has three circumferentially, equally spaced internal cammed surfaces 31. A section of each surface (radius A) is adapted to serve as a bearing surface for the exterior 12 of housing 11. Another section (radius B) of each cammed surface is adapted to provide clearance for roller 28 to move radially outward in passage 21 and gradually beyond exterior 12 until restrained by the cammed surface. Radius C blends the sections into a continuous surface.

Securing cam member 30 against shoulder 15 of locator housing 11 by socket head capscrews 32 is cover 34. Cover 34 has an elongated handle 35 preferably integral therewith. Cover 34 also has an aperture 36 therethrough aligned with inlet 19.

Attached to cam member 30 by socket head capscrews 38 is handle 39. Dowel pins 40 aid in locating handle 39 on cam member 30.

In operation, the staking device is placed in position on the upright pinion shaft 41 of a vehicle differential gear assembly 46. The pinion shaft 41, pinion nut 42 having nut flange 43 and the balance of the assembly 46 are shown in phantom lines (FIGURES 1 and 2) so as not to conflict with the outline of the staking device 11. The internal splined portions 18 of the entrance 16 engage the external splines 44 of the pinion shaft 41. Hard pinion shaft 41 also has a thread 45 engaged by soft pinion nut 41. Nut flange 43 is the support for the device 10 at seat 20. The device operator holds the device handle 35 in his left hand and prevents movement of the shaft 41 because of the internal splined portions 18 engaging the external splines 44 of the shaft 41. The weight of the device resting on the nut flange 43 tends to restrict movement of nut 42 on shaft 41.

With the right hand, the operator grasps handle 39 attached to cam member 30 and pulls the handle 39 toward handle 35. As the cam member rotates about locator housing 11 at exterior 12, each roller 28 which has been in contact with a non-bearing section of the cam surface and has been located partially out of passage 21 beyond exterior 12 now rolls onto the bearing section of the cammed surface and is forced back into passage 21 inside exterior 12. Roller 28 thus forces punch 24 in passage 21 against spring 29 to contact nut flange 43. The pointed end 25 of punch 24 forces the nut flange between the external splines 44 of pinion shaft 41 that are engaged by a tooth of the splined portion 18 aligned with the punch point. Because of the simultaneous action of the equally spaced staking punches and because they are directed radially inward on the nut flange 43, there is little possibility for the nut 42 to be rotated on shaft 41. Although not shown, stops can be located on the handles to prevent further relative movement thereof after the nut has been staked on the shaft as best shown in FIGURE 1. Normally the operator can detect the completion of the staking operation and will desist from moving further handle 39.

Upon rotation of the cam 30 and handle 39 in the opposite direction about locator housing 11, the spring 29 because of its location in punch opening 26 forces the punch 24 and the roller 28 outward in passage 21 until the roller contacts the non-bearing section of the cammed surface (radius C and B) beyond the housing 12. Thus the punch of the device has moved from the nut flange 43 after staking same to shaft 41 and the device is free to be lifted from the assembly.

Due to the unique construction of the staking device, the nut flange 43 has been staked to the shaft 41 precisely between the external splines 44 in preferably no more than three places for effective locking of nut to shaft. The soft nut, therefore, can be easily disassembled from the hard shaft and can also be later re-staked to the shaft in preferably three different locations. Further, the locking has been accomplished without relative movement between the nut and the shaft.

Having thus described the invention, it will be realized that the drawings show merely a preferred embodiment thereof and various changes in size, shape or arrangement of parts may be employed without departing from the spirit of the invention or the scope of the subjoined claims.

I claim:
1. A staking device comprising:
   (a) a locator housing, said housing defining a chamber having an entrance, a portion of said entrance having internal splines, said chamber having an inlet located generally opposite said entrance, said inlet being larger than said entrance, said inlet having a peripheral seat defining said entrance and extending normal thereto, said housing having a passage extending from said housing exterior into said chamber and said inlet, the internal end of said passage being aligned with said internal splines through said inlet and entrance;
   (b) a staking punch slidably located in said passage, one end of said punch being located adjacent said housing exterior and the pointed, staking end of said punch being aligned with a tooth of said internal splines;
   (c) a roller located in said passage and contacting said one end of said punch, a part of said roller projecting from said passage outward of said housing exterior; and
   (d) cam means surrounding said locator housing, said cam means having an internal cammed surface engaging said housing exterior and the part of the roller projecting from said housing exterior, said cammed surface being adapted upon rotation of said cam means about said housing to force said roller further into said passage and said punch in contact therewith to move inward in said passage to stake a flange of a nut contacting said seat into a root of an external splined shaft engaging said internal splines of said housing to lock the nut threaded to the shaft, without relative movement between the nut and shaft.

2. The staking device of claim 1 further comprising: spring means to move said punch and said roller outward in said passage upon rotation of said cam means in the opposite direction.

3. A staking device comprising:
   (a) a locator housing, said housing defining a chamber having a circular entrance, a portion of said entrance having internal splines, said chamber having an inlet located generally opposite said entrance, said inlet being larger than said entrance, said inlet having a circular seat defining said entrance and extending normal thereto, said housing having a passage extending from said housing exterior into said chamber and said inlet, the internal end of said passage being aligned with said internal splines through said inlet and entrance, said locator having a gallery connected to said passage and extending on both sides thereof and substantially transverse thereto;
   (b) a staking punch slidably located in said passage, one end of such punch being located adjacent said housing exterior and the pointed, staking end of said punch being aligned with a tooth of said internal splines, said punch having a tranverse opening therein;
   (c) a generally flat type spring located in said gallery and extending through said opening on both sides of said punch;
   (d) a roller located in said passage and contacting said one end of said punch a part of said roller projecting from said passage outward of said housing exterior; and (e) cam means surrounding said locator housing, said cam means having an internal cammed surface engaging said housing exterior and the part of the roller projecting from said housing exterior, said cammed surface being adapted upon rotation of said cam means about said housing to force said roller further into said passage and said punch in contact therewith against the action of said spring to move inward in said passage to stake a flange of a nut contacting said seat into a root of an external splined shaft engaging said internal splines of said housing to lock the nut threaded to the shaft, without relative movement between the nut and shaft, and the spring moving the punch outward in said passage upon opposite rotation of the cam means.

4. A staking device comprising:

(a) a locator housing, said housing defining a chamber having a circular entrance, three circumferentially, equally spaced portions of said entrance having internal splines, said chamber having an inlet located generally opposite said entrance, said inlet being larger than said entrance, said inlet having a circular seat defining said entrance and extending normal thereto, said housing having three circumferentially, equally spaced passages extending from said exterior radially inward into said chamber and inlet, the internal end of each passage being aligned with an internal splined portion through said inlet and entrance, said housing also having a gallery connected to each of said passages and extending on both sides thereof and substantially transverse thereto;

(b) a staking punch slidably located in each of said passages, one end of each of said punches being located adjacent said housing exterior and the pointed, staking end being aligned with a tooth of an internal splined portion, said punch having a transverse opening therein;

(c) a generally flat type spring located in each of said galleries and extending through said opening on both sides of said punch;

(d) a roller located in each of said passages and contacting said one end of said punch, a part of said roller projecting from said passage outward of said housing exterior; and (d) cam means surrounding said locator housing, said cam means having three circumferentially equally spaced internal cammed surfaces engaging said housing exterior, each of said cammed surfaces also engaging a part of a roller projecting from said housing exterior, each of said cammed surfaces being adapted upon rotation of said cam means about said housing to force a roller further into a passage and a punch in contact therewith against the action of a spring to stake a flange of a nut contacting said seat into a root of an external splined shaft engaging an internal splined portion of said housing to lock the nut threaded to the shaft, in three places without relative movement between the nut and shaft, and with each spring moving a punch outward upon opposite rotation of the cam means.

5. The staking device of claim 4 further comprising: a first handle means secured to said locator housing for manually holding said housing and therefore the splined shaft and nut stationary during the staking operation and a second handle means secured to said cam means for manually rotating said cam means.

References Cited

UNITED STATES PATENTS

| | | | |
|---|---|---|---|
| 1,493,515 | 5/1924 | Berthold | 72—402 |
| 2,467,012 | 4/1949 | Deuschle | 72—402 |
| 2,514,507 | 7/1950 | Mueller | 72—402 |
| 2,538,343 | 1/1951 | Van Winkle | 81—10 |
| 2,787,925 | 4/1957 | Buchanan et al. | 72—402 |
| 3,012,421 | 12/1961 | Cull | 29—517 |

CHARLES W. LANHAM, *Primary Examiner.*

L. A. LARSON, *Assistant Examiner.*